J. M. WILDERMAN.
TRANSMISSION GEAR.
APPLICATION FILED AUG. 3, 1908.
932,216.
Patented Aug. 24, 1909.
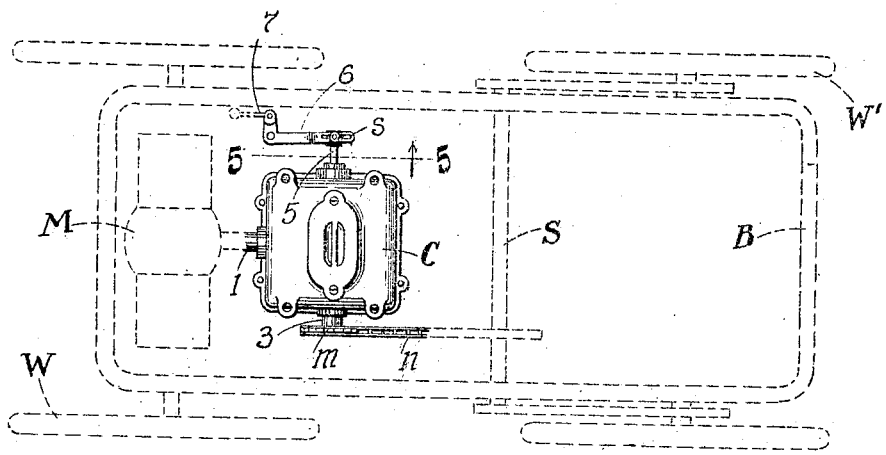
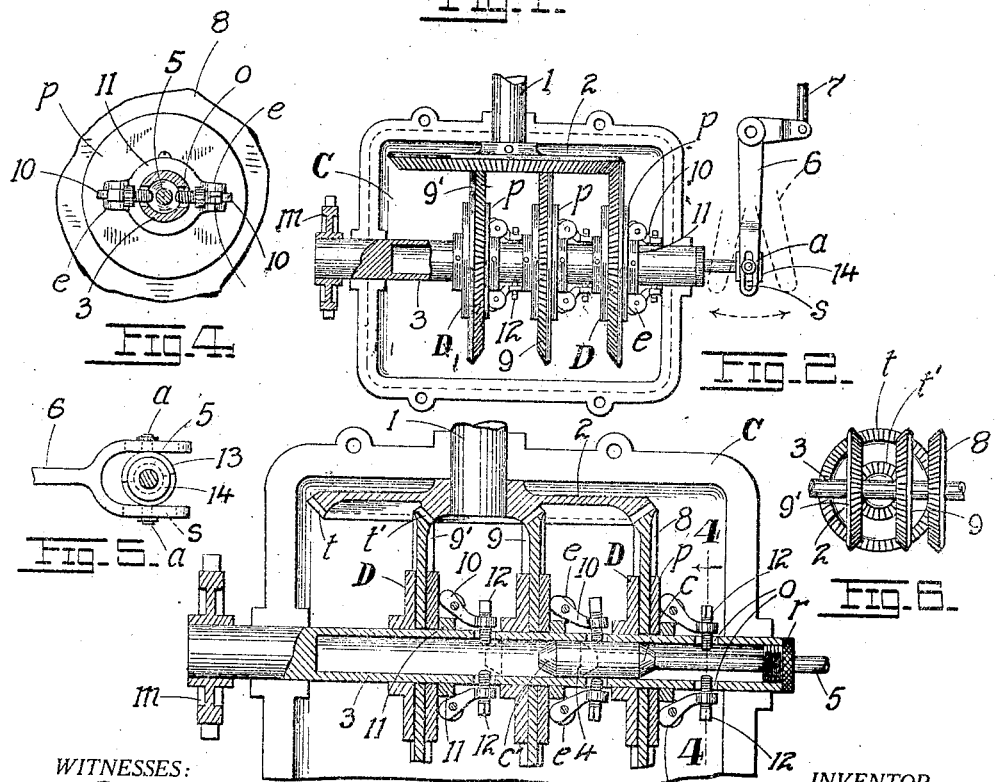
WITNESSES:
INVENTOR.
Joseph M. Wilderman
BY
ATTORNEY.

UNITED STATES PATENT OFFICE.

JOSEPH M. WILDERMAN, OF ST. LOUIS, MISSOURI.

TRANSMISSION-GEAR.

932,216.

Specification of Letters Patent. Patented Aug. 24, 1909.

Application filed August 3, 1908. Serial No. 446,633.

*To all whom it may concern:*

Be it known that I, JOSEPH M. WILDERMAN, citizen of the United States, residing at St. Louis, State of Missouri, have invented certain new and useful Improvements in Transmission-Gear, of which the following is a full, clear, and exact description, reference being had to the accompanying drawings, forming a part hereof.

My invention has relation to improvements in transmission gearing; and it consists in the novel details of construction more fully set forth in the specification and pointed out in the claims.

In the drawings, Figure 1 is a top plan of my invention showing its application to a self-propelled vehicle; Fig. 2 is a top plan of the gear mechanism, the cover or upper section of the casing being removed; Fig. 3 is an enlarged horizontal middle section of the gearing; Fig. 4 is a transverse section on the line 4—4 of Fig. 3; Fig. 5 is a section on the line 5—5 of Fig. 1; and Fig. 6 is an inner face view of the motor-shaft gear showing the transmission gears in mesh therewith.

The object of my invention is to construct a transmission gear specially (though not exclusively) adapted for service on automobiles or self-propelled vehicles, with a view of regulating the speed of the running gear and consequently the speed of the vehicle, and with a view of reversing the direction of travel of the vehicle by a corresponding reversal of the motion of the running gear.

A further object is to accomplish the several results therein, in a speedy and economic manner all as will hereinafter more fully appear from a detailed description of the invention which is as follows:—

Referring to the drawings, B represents a vehicle body having front and rear wheels W, W' respectively, the axle of the rear wheels being geared to a transverse running-gear shaft S in any approved manner as fully understood in the art. At the front end of the vehicle is located a motor M, herein only conventionally shown, the shaft 1 of which terminates at its outer end in a bevel-gear wheel 2 inclosed in a casing C which is preferably made of two sections bolted together, the motor-shaft 1 extending longitudinally with the vehicle body or at right angles to the running-gear shaft S. Disposed parallel to the shaft S within the casing C is a tubular transmission-shaft 3 (the greater portion of the length thereof being hollow) in which is free to reciprocate a plunger or head 4 formed at the inner end of a reciprocating stem 5, the head being connected to said stem by a conical shoulder c as shown, the free end c' of the head being likewise tapering as shown. The plunger or head is controlled from the terminally slotted forked long arm of a bell-crank lever 6 pivoted to the vehicle body, the short arm of the bell-crank being coupled to a rod 7 which may be actuated by any specially devised system of links (not shown) and within easy reach of the driver or chauffeur. A pin a passes through the slot s of the lever to allow for the necessary oscillation of the lever under the circumstances.

The gear-wheel 2 is provided with an outer toothed section t, and an inner toothed section t', there being in mesh with the larger and outer section the bevel transmission gear wheel 8, and with the smaller section the transmission pinions 9, 9' at points diametrically opposite to one another. These gears (8, 9, 9') are loose upon the shaft 3, and bear with one face against an abutment disk D, which is rigidly secured to the shaft. Adjacent to the opposite faces of the transmission gears (8, 9, 9') are the plates p which are loose upon the hollow shaft 3, said plates being directly engaged by the short arms or cams of a series of dogs or clutch-levers 10 pivotally mounted between ears or lugs e e formed on the bands or rings 11 secured to the shaft. The free ends of the long arms of the dogs are provided with adjusting screws 12 which play through peripheral openings o formed in the walls of the hollow shaft 3, and enter sufficiently into the bore of the shaft to be engaged by the plunger head 4 and its conical formations c, c'.

To allow the plunger head 4 and its stem 5 to revolve with the hollow shaft 3, the outer end of the stem is preferably provided with a loose ring 13 between two collars 14, 14 on the stem, the pins a passing through the slots s of the fork members. This arrangement will prevent any friction between the plunger head and the inner wall of the hollow shaft, since the parts revolve as a unit. When the ring 13 wears out a new one can be substituted, the ring being preferably made split to facilitate replacing and removal. The end of the shaft 3 through which the stem 5 passes is closed by a screw plug or ring r.

The operation of the invention is as follows: The hollow shaft 3 is connected to the running gear by a chain n leading from the sprocket wheel m secured to one end of the shaft. With the rotation of the motor-shaft 1, rotation is imparted to the driving member 2, which in turn simultaneously rotates the several members 8, 9, 9' mounted loosely on the hollow shaft 3. The chauffeur by properly manipulating or rocking the bell-crank lever 6 can slide the plunger-head 4 in one direction or the other, in which movements the inner ends of the adjusting screws 12 carried by the dogs 10 are first engaged by the conical ends c, c' of the head (depending on which direction the head 4 is being moved, and on which side of any particular sets of dogs the head happens to be), and when the body of the head encounters the screws 12, it swings the long arms of the levers or dogs 10 outwardly, causing the short arms or cams thereof to oscillate inwardly and wedge themselves against the wearing plates p, which being loose upon the shaft are forced against the adjacent member 8, 9, or 9' as the case may be, forcing such member firmly against its abutment D, and thereby clutching such member to the shaft 3. The particular member 8, 9, or 9' which thus happens to be clutched or locked to the shaft 3 will transmit the rotation from the member 2 to said shaft 3, the latter in turn communicating its motion to the running gear as clearly obvious from the drawing. To run the vehicle forward, (in which case a high speed is resorted to) the chauffeur locks the member 8 to the shaft 3 by wedging the dogs identified with said member against the plate p of said member; for a slow speed, the chauffeur advances the head until it has released the dogs of the member 8, and engaged the dogs of the member 9; for reversing the motion of the shaft 3, the chauffeur advances the head 4 until the member 9' has been locked to the shaft, whereby a reverse rotation is imparted to the latter, a fact quite obvious since the member 9' is disposed on the opposite side of the center of the member 2 from that of the member 9. It is apparent of course that the members 2, 8, 9, 9' may be friction gears instead of toothed gears; that the invention may be applied to other purposes than those here illustrated; that the number of transmission gears 8, 9, 9' need not be limited to three; that the manner of effecting the clutching of the gears to the shaft 3 need not necessarily follow the precise details here shown. By carefully adjusting the screws 12 any degree of friction between the gears and their abutments by which the necessary locking or clutching of the gear to the shaft is effected, may be attained. Once the head 4 has locked any gear member to the shaft 3, said head and its stem 5 will rotate as a unit with the shaft, and for this purpose the stem is provided with a loose ring 13, which is gripped by the forked end of the long arm of the bell-crank shifting lever 6.

Having described my invention what I claim is:

1. In a transmission gear, a hollow shaft, a rotatable member loosely mounted thereon, an abutment fixed to the shaft and engaging one face of the member, a pivoted clutch-dog carried by the outer wall of the shaft on the opposite side of the rotatable member and oscillating in a plane parallel to the axis of the shaft, and devices within the shaft controlled from a point beyond the shaft for actuating the dog.

2. In a transmission gear, a hollow shaft, a rotatable member loosely mounted thereon, an abutment fixed to the shaft and engaging one face of the member, a pivoted clutch-dog carried by the outer wall of the shaft on the opposite side of the rotating member and having a portion on one arm passing into the interior of the hollow shaft through an opening removed a suitable distance from the axis of oscillation of the dog, said dog oscillating in a plane parallel to the axis of the shaft, and a plunger in the hollow shaft for tripping the dog by engaging the portion projecting into the shaft through the opening aforesaid.

3. In a transmission gear, a hollow shaft, a rotatable member loosely mounted thereon, an abutment fixed to the shaft and engaging one face of the member, a pivoted clutch-dog carried by the outer wall of the shaft on the opposite side of the rotatable member, and oscillating in a plane parallel to the axis of the shaft and having an adjusting screw on one arm projecting into the interior of the hollow shaft through an opening removed a suitable distance from the axis of oscillation of the dog, and a plunger in the hollow shaft for tripping the dog by engaging the screw projecting through the opening aforesaid.

In testimony whereof I affix my signature, in presence of two witnesses.

JOSEPH M. WILDERMAN.

Witnesses:
 EMIL STAREK,
 FANNIE E. WEBER.